United States Patent
Bowman et al.

(10) Patent No.: US 10,614,180 B2
(45) Date of Patent: Apr. 7, 2020

(54) SYSTEM AND METHOD FOR CONCURRENT MULTI-USER CAX WORKFLOW

(71) Applicant: Brigham Young University, Provo, UT (US)

(72) Inventors: Kelly Eric Bowman, Provo, UT (US); Timothy A. Bright, Provo, UT (US); Charles Gregory Jensen, Provo, UT (US); Ammon Hepworth, Provo, UT (US); Jared Calvin Briggs, Provo, UT (US); Walter Edward Red, Provo, UT (US); Joshua Coburn, Orem, UT (US); Brett Stone, Lehi, UT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 14/243,787

(22) Filed: Apr. 2, 2014

(65) Prior Publication Data

US 2014/0317589 A1    Oct. 23, 2014

Related U.S. Application Data

(60) Provisional application No. 61/807,733, filed on Apr. 2, 2013.

(51) Int. Cl.
*G06F 17/50* (2006.01)

(52) U.S. Cl.
CPC .......... *G06F 17/5018* (2013.01); *G06F 17/50* (2013.01); *G06F 2217/04* (2013.01)

(58) Field of Classification Search
CPC .................. G06F 17/5018; G06F 2217/04
(Continued)

(56) References Cited

U.S. PATENT DOCUMENTS 7,219,043 B2 * 5/2007 Rebello ............. G05B 19/4097
                                                  700/182
8,229,715 B1 * 7/2012 Teller ....................... G06F 17/50
                                                  434/72

(Continued)

OTHER PUBLICATIONS

PCT/US2014/032733, International Search Report and Written Opinion, dated Sep. 5, 2014.
(Continued)

*Primary Examiner* — Jack Chiang
*Assistant Examiner* — Brandon Bowers
(74) *Attorney, Agent, or Firm* — Kunzler Bean & Adamson (57) ABSTRACT

A system for concurrent CAx workflow includes a collaborative server that manages a model of an engineering object, the model comprising at least design data and analysis data corresponding to the design data, a design client for editing of the design data by a design user, an analysis client for editing of the analysis data by an analysis user concurrent with editing of the design data by the design user; and wherein the collaborative server and the analysis client are collectively configured (i.e., one or both are configured) to enable the analysis user to edit the analysis data, view a plurality of geometric elements within the design data, and create a reference within the analysis data to a selected geometric element of the plurality of geometric elements within the design data. A corresponding apparatus, method, and computer-readable medium are also disclosed herein.

14 Claims, 4 Drawing Sheets

(58) Field of Classification Search
USPC .......................................................... 716/139
See application file for complete search history.

(56) References Cited

U.S. PATENT DOCUMENTS

| | | | |
|---|---|---|---|
| 8,768,655 | B2 | 7/2014 | Singh et al. |
| 8,892,404 | B2 * | 11/2014 | Potter ..................... G06F 17/50 703/1 |
| 2003/0149498 | A1 | 8/2003 | Rebello et al. |
| 2003/0179230 | A1 * | 9/2003 | Seidman ............... G06F 3/1454 715/750 |
| 2012/0109590 | A1 | 5/2012 | Trainer et al. |
| 2012/0110595 | A1 * | 5/2012 | Reitman ................ G06F 17/50 719/313 |
| 2012/0317497 | A1 | 12/2012 | Red et al. |

OTHER PUBLICATIONS

PCT/US2014/032733, International Preliminary Report on Patentability, dated Oct. 6, 2015.

* cited by examiner

SYSTEM AND METHOD FOR CONCURRENT MULTI-USER CAX WORKFLOW

CROSS-REFERENCE TO RELATED APPLICATIONS

This application claims the benefit of U.S. provisional application 61/807,733 entitled "Discipline Interoperable System" and filed on 2 Apr. 2013. The foregoing application is incorporated herein by reference.

BACKGROUND

Technical Field

The subject matter disclosed herein relates generally to systems and methods for performing engineering design and analysis.

Discussion of the Background

Current engineering software does not allow more than one user to operate on a file at the same time, and is strictly single-user, where design, analysis, and manufacturing planning are sequential. Files are often very difficult to translate between formats required by various CAx tools directly, so there may be data loss due to tolerance mismatch and object definition inconsistencies.

Some CAx software allows users to create designs and perform analyses from within the same software. However, this still results in separate models—one for design, the other for analysis, where data must often be simplified and translated.

Figure 1:
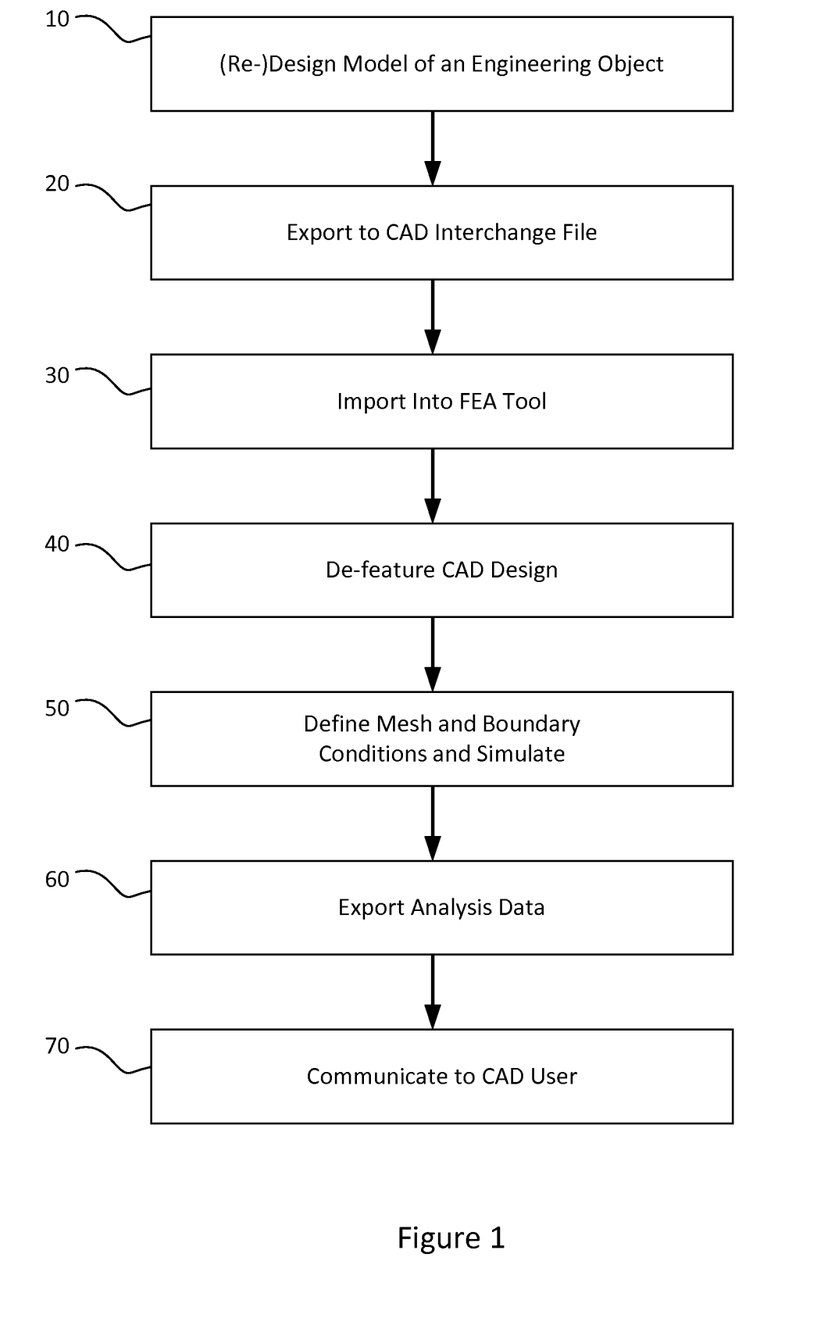
FIG. 1 is a flowchart depicting a typical prior-art CAx design and analysis work flow.

FIG. 1 is a flowchart depicting a typical prior-art design and analysis work flow. As depicted, the work flow includes designing 10 a model of an engineering object, exporting 20 to a CAD interchange file, importing 30 into an FEA (Finite Element Analysis) Tool, de-featuring 40 the CAD design, defining 50 mesh and boundary conditions and simulating, exporting 60 analysis data, and communicating 70 to CAD user. The depicted operations are typically performed by engineers, with little automated assistance from CAD software or workstations. Although the depicted operations focus on design and analysis, other CAx operations such as manufacturing planning have similar workflows.

Designing or redesigning 10 a model of an engineering object may include various operations such as creating a CAD model using CAD software, or modifying a pre-existing model in the case of a design modification. Exporting 20 to CAD interchange file may include commanding the CAD software to export the model in a file format compatible with the intended analysis tool.

Importing 30 into the FEA (Finite Element Analysis) tool may include importing the exported CAD interchange file. De-featuring 40 CAD design may include removing features that aren't essential for the analysis or that interfere with analysis. In some workflows, de-featuring may be performed in the CAD software before export.

Defining 50 mesh and boundary conditions and simulate may include using the analysis software to define loads, or other boundary conditions such as flow rates, etc., as well as to provide adjustments to the mesh generator to improve performance or accuracy. Then the simulation or analysis is performed using FEA software or the like.

Exporting 60 analysis data may include commanding the analysis software to export the analysis data, possibly for analysis using stand-alone data visualization software. Communicating 70 to CAD user may include communicating a file showing the visualization result, or communicating a summary of suggested changes to the CAD model that would improve its simulated performance.

As is apparent from the steps above for a single iteration of analysis and re-design, the time-consuming effort of exporting, importing, setting up the model for analysis and the like represents time that could be better spent doing engineering. The embodiments disclosed herein were developed in response to these issues.

Given the foregoing, what is needed is an environment where multiple users from various disciplines can work together without constant inter-discipline translation and thereby achieve a greatly streamlined CAx workflow.

SUMMARY OF THE INVENTION

A system for CAx workflow related to an engineering object includes a collaborative server that manages a model of an engineering object, the model comprising various types of discipline-related data such as design data, and analysis data that corresponds to the design data. The system may also include a variety of discipline-related clients such as a design client for editing of the design data by a design user and an analysis client for editing of the analysis data by an analysis user concurrent with editing of the design data by the design user. The collaborative server and the analysis client may be collectively (i.e., one or both) configured to enable the analysis user to view the design data and edit the analysis data.

The embodiments disclosed herein enable designers, analysts, and others to synergistically operate on the same feature-based geometry model, thereby substantially eliminating the time required to translate models between disciplines, as well as any errors commonly associated with the processes. Furthermore, the system may integrate various CAx disciplines such as multi-user CAD, multi-user analysis, and manufacturing planning, and utilize a common geometry and topology definition. In some embodiments, model updates and edits are executed on a central cloud-based server, thereby providing a single, global model for all operations.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Some of the functional units described in this specification have been labeled as modules, in order to more particularly emphasize their implementation independence. Others are assumed to be modules. For example, a module or similar unit of functionality may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices or the like.

A module or a set of modules may also be implemented (in whole or in part) as a processor configured with software to perform the specified functionality. An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, enable the module to achieve the intended purpose for the module.

Indeed, the executable code of a module may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any tangible form capable of enabling execution of a program of machine-readable instructions on a digital processing apparatus. For example, a computer readable medium may be embodied by a flash drive, compact disk, digital-video disk, a magnetic tape, a Bernoulli drive, a magnetic disk, a punch card, flash memory, integrated circuits, or other digital processing apparatus memory device. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
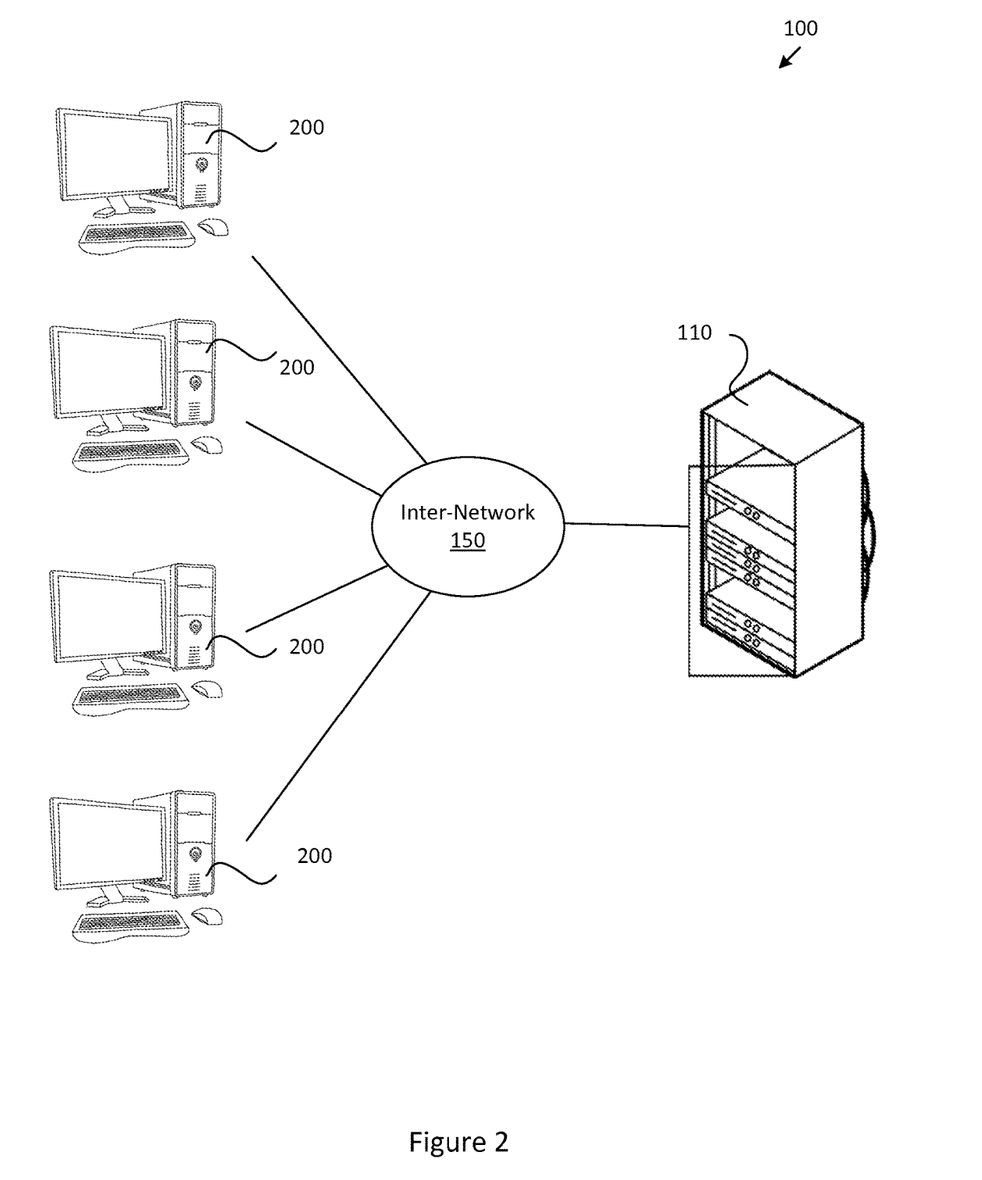
FIG. 2 is schematic drawing of a multi-user CAx design system including a collaborative server and multiple clients.

FIG. 2 is schematic drawing of a multi-user CAx system 100 that includes a collaborative server 110, an inter-network 150, and multiple clients 200. The multiuser CAx design and analysis system 200 enables automated CAD data translation, enables multiple CAx users to collaborate efficiently on creating, analyzing, and modifying objects modeled with the CAx software, and improves the overall efficiency of CAx related activities.

The collaborative server 110 stores design data, such as geometries, features, parameters, and the like, as well as analysis data, and communicates with the clients 200. Changes made to the model by a client 200 may be communicated to the other clients 200 operating on that portion of the model that was changed. The collaborative server 110 may include a server with a single processor, a server with multiple processors, or a server cluster. In one embodiment, the model of the engineering object on collaborative server 110 is stored in a generic or vendor-neutral format.

The inter-network 150 may include a wireless network such as Wi-Fi, a wired network, Internet, or combination of other networks for communicating data. In one embodiment, the inter-network 150 is the internet. In another embodiment, the inter-network 150 is a virtual private network (VPN).

The clients 200 may be workstations capable of running design software or analysis software, or other CAx software such as CAM. The software may be provided by a single vendor, or be from multiple vendors. The term workstation, as used herein, means one or more devices at which a user could work, with means for displaying information such as a computer monitor or the like, means to obtain user input such as keyboard, touchscreen or mouse, and means to execute software such as a local processor(s), remote processors(s), or a combination thereof.

Figure 3:
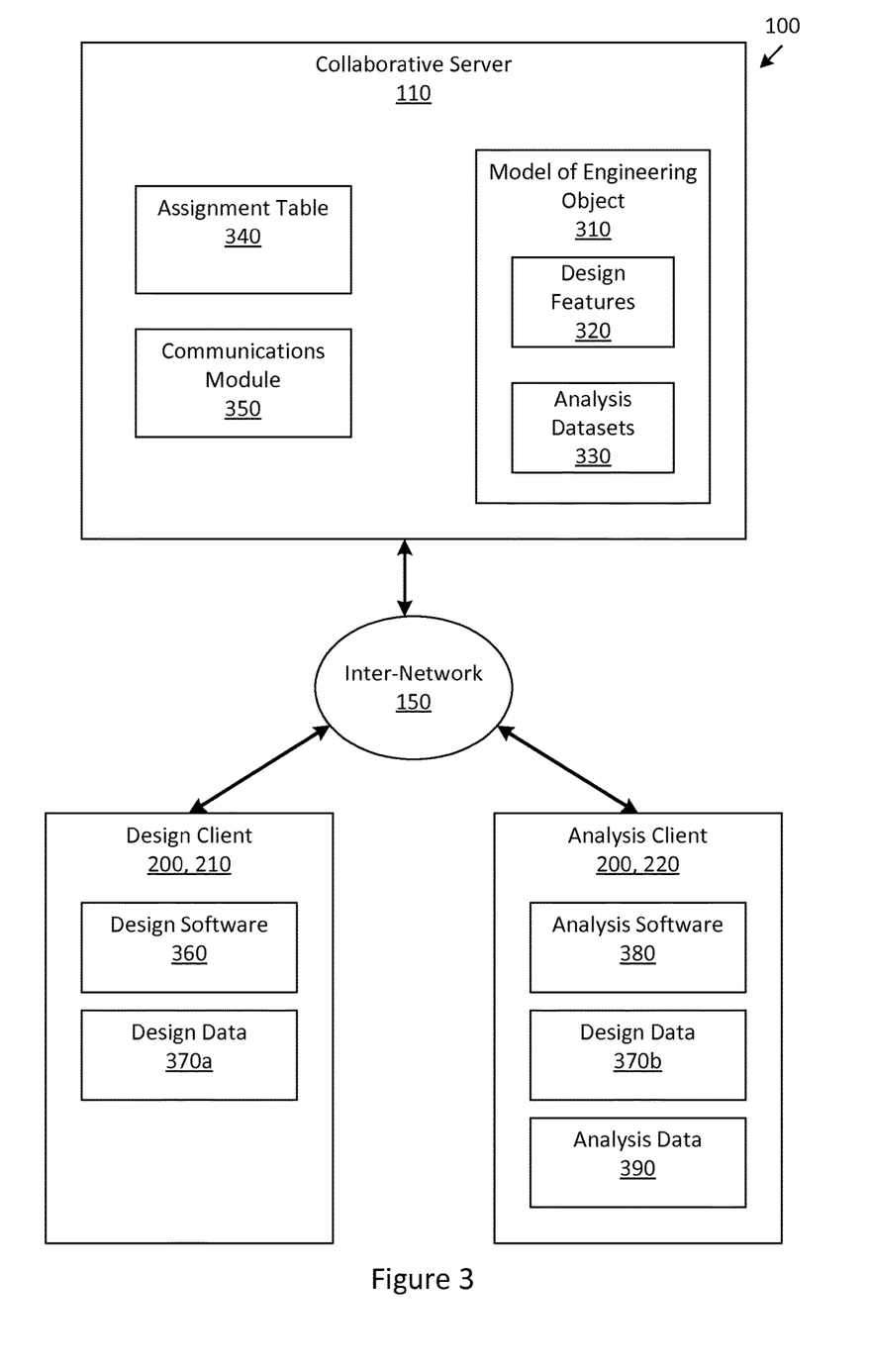
FIG. 3 is a functional block diagram depicting one embodiment of the multi-user CAx design system including a collaborative server, a design client, and an analysis client.

FIG. 3 is a functional block diagram depicting one embodiment of the multi-user CAx workflow system 100 depicted in FIG. 2 that includes a collaborative server 110, and multiple clients 200 such as a design client 210 and an analysis client 220. The collaborative server 110 may include a model of an engineering object 320 that includes design features 340 and analysis datasets 330, an assignment table 340, and a communications module 350. The design client 210 may include design software 360 and design data 370a. The analysis client 220 may include design data 370b, analysis software 380, and analysis data 390. The various modules depicted in FIG. 3 function cooperatively to enable multiple users to cooperatively edit and analyze a single, global model of an engineering object, without the need for manual translation between file formats and the recreation of analysis parameters with each edit to the model.

The collaborative server 110 (introduced in the FIG. 2) may include a a model of an engineering object 310, an assignment table 340, and a communications module 350. The model of an engineering object 310 may be stored on the collaborative server 110. In one embodiment, the model is feature-based, meaning the model is defined by a set of features. The features may be ordered in a list data structure or a tree data structure, that when processed sequentially by the CAx software generate the solid geometry of the model. The design features 320 may be stored within the model of the engineering object on the collaborative server.

In many CAD systems, a CAD model could be comprised of a number of assemblies of multiple parts, where the parts are comprised of multiple features, that combined define one or more three-dimensional geometries. For the sake of brevity, the model will be referred to for the present discussion as a model comprised of features, even though there would typically be more levels of hierarchy in most CAD models.

The analysis datasets 330 may be associated with the model of an engineering object 310 and stored on the collaborative server 110. An instance of a portion or all of the analysis datasets may also be stored on the analysis client 220 and is referred to as analysis data 390. The analysis datasets 330 include information needed to run various types of analysis on the analysis clients 220, such as structural, thermal, fluid flow, etc. The analysis datasets 330 may include one or more references to geometric elements within the model of the engineering object 310. The references to geometric elements may be used to define the portion of the model to be analyzed, define elements within the geometric model to ignore, define locations where loads or temperatures are applied on the model, define locations in the model requiring higher resolution mesh generation, and the like. The analysis dataset 330 may also include parameter values, some of which may be associated with the reference(s) to geometric elements such as loads, mesh generation parameters, temperatures, flow rates, etc., to define the various initial conditions and parameters required to run the analysis properly. After an analysis run has taken place, the output data from the analysis software 380 may be stored within the analysis dataset, and a copy of the analysis dataset may be stored on the collaborative server 110. By storing analysis geometric references and parameter values in analysis datasets in association with the model on the collaborative server 110, the information does not need to be recreated when minor changes are made to the model, as must be done in prior art CAx design and analysis workflows.

The assignment table 340 may include data recording the current assignments of the various features and datasets in the model of the engineering object 310 and thereby manage editing privileges of the various clients. In one embodiment, assigning editing privileges on a feature by feature basis enables the collaborative server 110 to manage multiple design clients editing the same part. The assignment table 340 data may be stored in any appropriate data structure. The assignment table 340 may also record editing privileges for analysis datasets 330, such as recording an assignment of a selected analysis dataset 330 to be edited exclusively by a selected user.

By utilizing the assignment table 340 to assign modification privileges on a feature-by-feature basis to users at design clients 210 and accepting modification requests from the design clients 210 only for features for which they have been individually assigned, editing by multiple users to edit the same part concurrently as long as they are editing different features within the part, which improves engineering productivity over prior art methods that don't allow concurrent editing of a single part.

The communications module 350 may manage communications between the collaborative server 110 and the design client(s) 210 and analysis client(s) 220. Communication typically comprises sending updates such as feature updates to the clients 200 for a part that has been edited by another client, requests for analysis datasets 330, adding new parts to the model, requests for copies of the engineering object, and the like.

The design client 210 may be a workstation configured with design software 360 and design data 370a. In one embodiment the design software 360 is a commercial CAD package with an additional plug-in to handle interactions with the collaborative server. In another embodiment, the design software manages interactions with the collaborative server 110 natively without a plug-in.

The design data 370a may define the engineering object geometrically, as in defining a solid geometric model. In one embodiment, the design data 370a is feature-based that is sequentially processed by the CAx software to generate one or more solid geometries of the model. The design data 370a may be a local instance of the model of the engineering object 310 that is maintained on the collaborative server 110, or a portion of it. In one embodiment, the design data 370a on the design client 210 is stored in a format compatible with the design software 360, but different than the format of the engineering object 310 on the collaborative server 110, and the format is translated to the proper format for the design client 210 before being stored on the design client 210, with the opposite translation in the other direction.

The analysis client 220 may be a workstation configured with analysis software 380, analysis data 390, and design data 370b. The analysis software 380 may be configured to perform engineering analysis such as stress, thermal, fluid flow, etc. In some embodiments, both design software 360 and analysis software 380 are installed on the same workstation, and that workstation may function as either design client or an analysis client.

The user at the analysis client 220 may be able to obtain design data 370b, which is a local instance of all or a portion of the model of the engineering object 310. In one embodiment, the design data 370b is converted to a format compatible with the analysis software 380 before being stored on the analysis client 220. The analysis user may view and reference geometric elements within the design data 370b in order to set up the analysis, and use the design data 370b as the geometry for the analysis. In one embodiment, the design data 370b is not editable by the user at the analysis client 220 and changes to the model geometry that is stored on the collaborative server 110 from the analysis client 220 are blocked.

The analysis data 390 is data may include parameter values and geometric references required to run the analysis, as discussed earlier in the discussion regarding the analysis datasets 330. The analysis client 220 may be configured to store analysis data 390 that has been supplied by the collaborative server 110 (the data being referred to as analysis datasets 330 when stored on the collaborative server 110), or analysis data 390 that has been created by the user at the analysis client 220 but not yet uploaded to the collaborative server 110.

Figure 4:
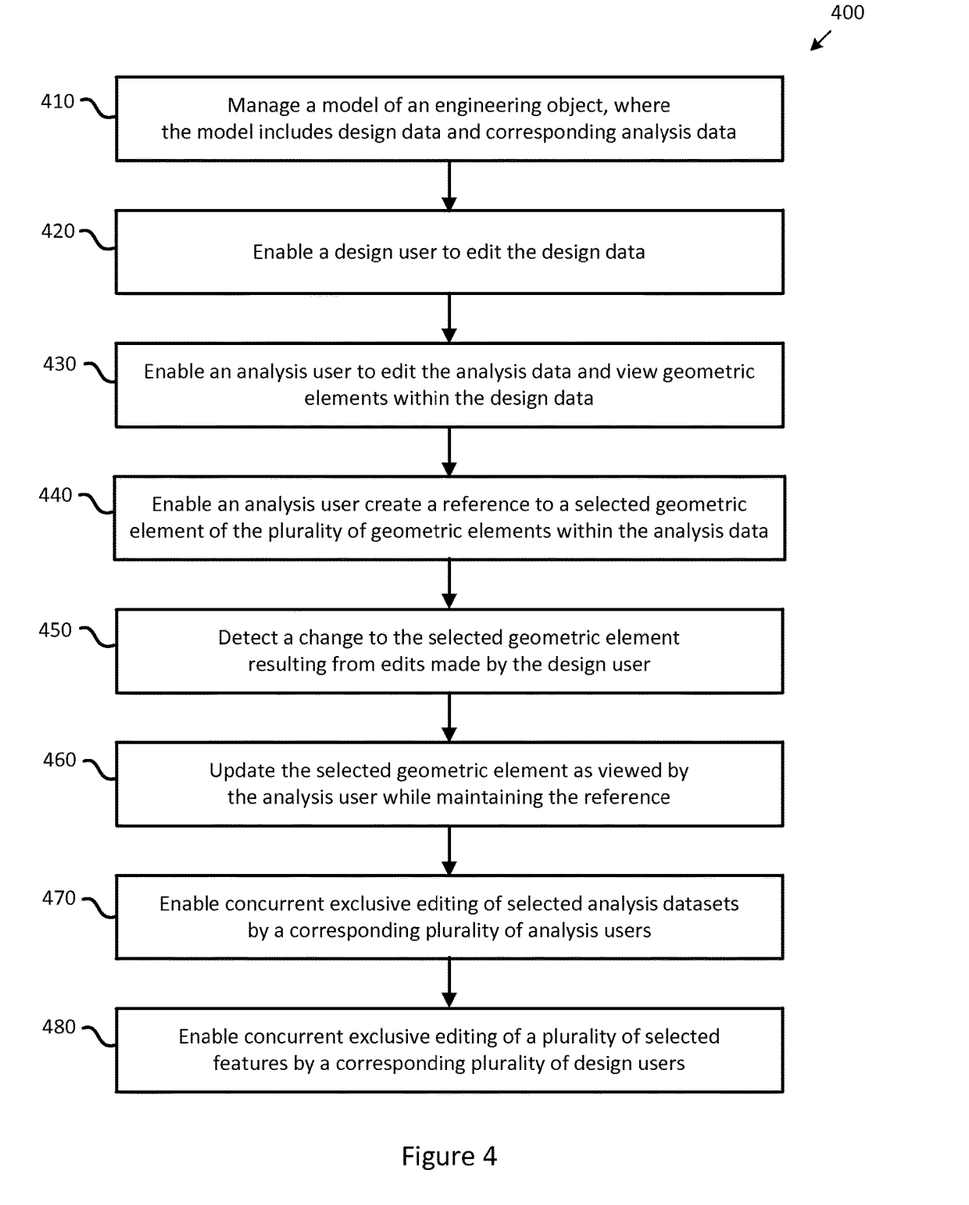
FIG. 4 is a flowchart depicting one embodiment of a method for concurrent CAx workflow.

FIG. 4 is a flowchart depicting one embodiment of a method for concurrent CAx workflow. As depicted, the method 400 includes managing 410 a model of an engineering object, enabling 420 a design user to edit the design data, enabling 430 an analysis user to edit the analysis data, enabling 440 an analysis user to create a reference to a geometric element within the design data, detecting 450 a change to the geometric element, updating 460 the geometric element, and enabling 470 and 480 concurrent exclusive editing. This method 400 enables multiple users in various disciplines to simultaneously work on the same model, eliminates the need for manually initiated translation between disciplines, enhances collaboration among disciplines, and maintains a single model for the life of the product.

Managing 410 a model of an engineering object 310 (where the model includes design data and corresponding analysis data) may include storing the features, parts, parameters, analysis datasets 330, etc. on a collaborative server 110. Managing the model may also include providing the model 310, portions of it, or corresponding analysis datasets 330 to the clients 200 by request.

Enabling 420 a design user to edit the design data may include providing design data 370a to the design user, detecting edits to the model on the design client 210, and updating the model 310 on the collaborative server appropriately.

Enabling 430 an analysis user to edit the analysis data may include enabling the analysis user to view geometric elements within the design data by providing design data 370b and analysis data 390 to the analysis client 220, detecting edits to the analysis data 390, and updating the corresponding analysis dataset 330 on the collaborative server appropriately. Enabling the analysis user to view geometric elements within the design data 370b may include displaying a multi-dimensional visualization of the design data 370b from within the analysis software 380. In some embodiments, the design data 370b provided is automatically provided in the format required by the analysis software 380 on the analysis client 220 by the collaborative server 110.

Enabling 440 an analysis user create a reference within the analysis data to a geometric element may include detecting that the user has selected a geometric element within the design data 370b, and recording a reference to the selected geometric element in the analysis data 390. The modification to analysis data 390 may be reflected to the corresponding analysis dataset 330 immediately, or at a logical time after a number of such selections and reference recordings have taken place. The user initiated reference would typically be performed while setting up parameters for analysis such as locations where loads are applied, initial temperatures, elements within the model to ignore, and the like.

Detecting 450 a change to the geometric element may include detecting one or more changes that result from edits made by the design user by monitoring edits made by design users and testing each against the referenced geometry contained in the analysis datasets 330 for a match. Updating 460 the geometric element may occur in real time and may include updating the selected geometric element as viewed by the analysis user while maintaining the reference may include determining if an analysis client 220 has analysis data 370b that includes the selected geometric element and updating the geometry within the analysis data 370b appropriately if it does, while maintaining same reference for the element as before.

Enabling 470 concurrent exclusive editing may include enabling exclusive editing of selected analysis datasets by a corresponding plurality of analysis users by providing copies of selected analysis datasets 330 to a plurality of analysis clients 220, while allowing only one of the clients modification privileges for each selected analysis datasets 330. Enabling 470 may also include enabling users at multiple analysis workstations to view any of the various analysis datasets and the results of analysis that has been run, while also restricting editing of a selected analysis dataset 330 to a single user.

Enabling 480 concurrent exclusive editing may include enabling exclusive editing of selected features by a corresponding plurality of design users by assigning modification privileges on a feature-by-feature basis to users at design clients 210, and accepting modification requests from the design clients 210 only for features for which they have been individually assigned. Enabling 480 may also include enabling multiple users to edit the same part concurrently as long as they are editing different features within the part, which improves engineering productivity over prior art methods that don't allow concurrent editing of a single part.

The method 400 enables the collaborative server to function as a single source of design and analysis data for multiple CAD systems and eliminates manual CAD data translation, reducing error and busy work and simplifying the interface between different companies. The method 400 provides for multiple users in various disciplines to simultaneously work on the same model, and eliminates the need for time-consuming translation between disciplines, enhance collaboration among disciplines, and maintain a single model for the life of the product.

In summary, the methods, apparatuses, and systems presented herein provide a number of distinct advantages over prior art methods, apparatuses, and systems. It should be noted that many of the functional units described herein such as those related to image processing are identified as modules. Others are assumed to be modules. Others are assumed to be modules. One of skill in the art will appreciate that the various modules described herein may include a variety of hardware components that provide the described functionality including one or more processors such as CPUs or microcontrollers, or programmable logic devices (i.e., hardware components) that is configured by one or more software components. The software components may include executable instructions or codes and corresponding data that are stored in a computer-readable storage medium such as a non-volatile memory, or the like. The instructions or codes may include machine codes that are configured to be executed directly by the processor. Alternatively, the instructions or codes may be configured to be executed by an interpreter, or the like, that translates the instructions or codes to machine codes that are executed by the processor.

It should also be understood that this description is not intended to limit the invention. On the contrary, the exemplary embodiments are intended to cover alternatives, modifications, and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A system for concurrent CAx workflow, the system comprising:
    a collaborative server configured to manage a model of an engineering object, the model comprising design data and analysis data corresponding to the design data, the design data comprising a set of geometric elements corresponding to the engineering object;
    the collaborative server further configured to enable concurrent exclusive editing of a plurality of geometric elements of the set of geometric elements by a corresponding plurality of design users operating a corresponding plurality of design clients;
    an analysis client for editing of the analysis data by an analysis user concurrent with editing of the design data by the plurality of design users;

wherein the collaborative server and the analysis client are collectively configured to enable the analysis user to edit the analysis data and view at least a portion of the set of geometric elements corresponding to the engineering object; and wherein the collaborative server and the analysis client are collectively configured to record a reference to a selected geometric element of the set of geometric elements within the analysis data responsive to detecting selection of the selected geometric element by the analysis user.

2. The system of claim 1, wherein the collaborative server and the analysis client are collectively configured to detect a change to the selected geometric element resulting from edits made by a design user of the plurality of design users and update the selected geometric element as viewed by the analysis user while maintaining the reference to the selected geometric element within the analysis data.

3. The system of claim 2, wherein the update to the selected geometric element as viewed by the analysis user occurs in real time.

4. The system of claim 1, wherein the collaborative server and a design client of the plurality of design clients are collectively configured to enable a design user of the plurality of design users operating the design client to view analysis results within the analysis data and edit the design data.

5. The system of claim 1, wherein the analysis data comprises a plurality of datasets corresponding to a plurality of analysis disciplines.

6. The system of claim 5, wherein the collaborative server is configured to enable concurrent exclusive editing of the plurality of datasets by a corresponding plurality of analysis clients.

7. A method for concurrent CAx workflow executed by one or more processors configured with software, the method comprising:

managing a model of an engineering object, the model comprising design data and analysis data corresponding to the design data, the design data comprising a set of geometric elements corresponding to the engineering object;

enabling concurrent exclusive editing of a plurality of geometric elements of the set of geometric elements by a corresponding plurality of design users operating a corresponding plurality of design clients;

enabling an analysis user operating a design client to edit the analysis data and view at least a portion of the set of geometric elements corresponding to the engineering object; and recording a reference to a selected geometric element of the set of geometric elements within the analysis data responsive to detecting selection of the selected geometric element the analysis user.

8. The method of claim 7, further comprising detecting a change to the selected geometric element resulting from edits made by a design user of the plurality of design users and updating the selected geometric element as viewed by the analysis user while maintaining the reference to the selected geometric element within the analysis data.

9. The method of claim 8, wherein the update to the selected geometric element as viewed by the analysis user occurs in real time.

10. The method of claim 7, wherein the analysis data comprises a plurality of datasets corresponding to a plurality of analysis disciplines.

11. The method of claim 7, further comprising enabling concurrent exclusive editing of the plurality of datasets by a corresponding plurality of analysis users.

12. A non-transitory computer-readable medium comprising one or more computer-executable instructions that, when executed by at least one computing device, cause the at least one computing device to:

manage a model of an engineering object, the model comprising design data and analysis data corresponding to the design data, the design data comprising a set of geometric elements corresponding to the engineering object;

enable concurrent exclusive editing of a plurality of geometric elements of the set of geometric elements by a corresponding plurality of design users operating a corresponding plurality of design clients;

enable an analysis user operating a design client to edit the analysis data and view at least a portion of the set of geometric elements corresponding to the engineering object; and record a reference to a selected geometric element of the set of geometric elements within the analysis data responsive to detecting selection of the selected geometric element by the analysis user.

13. The non-transitory computer-readable medium of claim 12, wherein the computer-executable instructions cause the at least one computing device to detect a change to the selected geometric element resulting from edits made by a design user of the plurality of design users and update the selected geometric element as viewed by the analysis user while maintaining the reference to the selected geometric element within the analysis data.

14. The non-transitory computer-readable medium of claim 13, wherein the update to the selected geometric element as viewed by the analysis user occurs in real time.

* * * * *